Sept. 17, 1940.                H. C. PINGEL                2,214,936
            KNITTING MACHINE PATTERN CONTROL MECHANISM
                    Filed Aug. 13, 1937           7 Sheets-Sheet 1

Fig. 1.

INVENTOR:
Henry C. Pingel,
BY
      ATTORNEY.

Sept. 17, 1940. H. C. PINGEL 2,214,936
KNITTING MACHINE PATTERN CONTROL MECHANISM
Filed Aug. 13, 1937 7 Sheets-Sheet 5

INVENTOR:
Henry C. Pingel,
BY Alfred E. Tschinger,
ATTORNEY.

Sept. 17, 1940.    H. C. PINGEL    2,214,936
KNITTING MACHINE PATTERN CONTROL MECHANISM
Filed Aug. 13, 1937    7 Sheets-Sheet 6

INVENTOR:
Henry C. Pingel,
BY
ATTORNEY.

Patented Sept. 17, 1940

2,214,936

UNITED STATES PATENT OFFICE 2,214,936

KNITTING MACHINE PATTERN CONTROL MECHANISM

Henry C. Pingel, Stony Creek Mills, Pa., assignor to Textile Machine Works, Wyomissing, Pa., a corporation of Pennsylvania Application August 13, 1937, Serial No. 158,847

32 Claims. (Cl. 66—155)

My invention relates to pattern control mechanisms for knitting machines, and particularly to mechanism of this character for automatically controlling the operation of a machine through a selective number of fabric forming steps.

It is usual in knitting machines, such as those of the full fashioned stocking or straight type, to employ pattern chains, or the like, and to vary the number of links in, or buttons on, the chains to vary the pattern or length of the fabric being knitted.

This method of, or means for, varying the pattern that a machine will produce by changing the chain links or buttons, has such disadvantages that it is undesirable and impractical to make such changes often, which is a limitation on the flexibility and adaptability of the machine to produce different fabrics.

It is also usual to employ course counting devices of one kind or another, but, to the best of my knowledge, no such device has heretofore obviated the necessity of changing the chain as above indicated.

It is an object of this invention to overcome the objections to prior art machines of the above-mentioned kind, and to provide a mechanism whereby a knitting machine may be so readily adjusted to change the pattern or length of the fabric, as to render such adjustment entirely feasible between each pair of successive whole fabric knitting operations if desired.

It is another object to enable such adjustment to be effected in a few seconds, by hand, without the aid of tools of any kind, and whereby an adjustment once effected may operate through the knitting of successive fabrics without further attention or manipulation.

Another object is to enable a knitting machine to produce fabrics of different length and pattern without changing a pattern device, as by removing and adding links or buttons of a chain.

Another object of my invention is to provide a mechanism for a knitting machine including a pattern device, and a dialing course counter device or means, whereby the latter is entirely self contained and adjustable without adding or removing parts, and wherein, upon certain operation of either the pattern or counter device, operation of the other is automatically instituted or controlled.

Another object of the invention is to provide a device of the above-indicated character in the form of an attachment which can readily be installed in existing machines without substantial alterations.

A further object of the invention is to provide a pattern control mechanism of the character set forth that is simple and durable in construction, economical to manufacture, and effective in its operation.

With these and other objects in view, which will become apparent from the following detailed description of the illustrative embodiment of the invention shown in the accompanying drawings, my invention resides in the novel elements, features of construction and arrangement of parts in cooperative relationship, as hereinafter more particularly pointed out in the claims.

In the drawings:

Figure 1 is a view, in front elevation, of a full fashioned knitting machine, showing only a portion thereof adjacent to the left end, as viewed in the figure, and including the pattern control mechanism of the invention;

In the drawings and description, only those parts necessary to a complete understanding of the invention have been set forth; further information as to the construction and operation of other elements not herein specifically pointed out, but which are usual and well known, being available in the pamphlet entitled "Full Fashioned Knitting Machines," copyright 1920, and in the "Reading" Full Fashioned Knitting Machine Catalogues, copyright 1929 and 1935, published by the Textile Machine Works, Reading, Pennsylvania, and in a pamphlet entitled "Knitting Machine Lectures," published in 1935 by the Wyomissing Polytechnic Institute, Wyomissing, Pennsylvania.

In practicing the invention, in one exemplary form embodied in a full fashioned stocking "footer" machine, it is employed to enable stocking blanks of different foot lengths to be manufactured readily and conveniently, each of several blanks produced being of the same foot length as the one preceding or following, or of different foot length from that blank, as desired, without adding any parts to, or taking them from, the machine, without stopping the machine during any one complete fabric knitting operation or cycle, and with substantially the same facility, and in substantially the same time, as in knitting successive stockings of one foot size, except for the greater time needed to knit a larger size foot portion than a smaller size foot portion at the same machine speed.

This result is accomplished through the use of a self-contained adjustable course counting or dialing mechanism including a pawl and ratchet advancing device, and a dog which can be adjusted to determine the number of courses to be knitted.

The pattern chain also has associated therewith a pawl and ratchet advancing device, and these parts are so inter-connected to the course counter parts that, as a certain button on the pattern chain reaches a chain follower, the chain advancing pawl is moved to inactive position, and the index wheel of the course-counter mechanism is moved to take its pawl off a dead spot on the associated ratchet disc. These operations stop the advance of the chain and start the operation of the counter mechanism which, after counting the selected courses, operates to cause resumption of operation of the chain advancing pawl against its ratchet wheel, the counter mechanism continuing to rotate after the chain has been restarted until the pawl of the counter mechanism again strikes said dead spot. The apparatus therefore repeats the formation of a given selected number of courses at a certain point of the pattern chain until the setting of the counter mechanism is changed by the operator. When it is not desired that the counter mechanism should have any effect, it is set in a zero position provided therein.

These operations take place in an area of repetitional courses, as in the sole portion of a stocking foot, between the patterned portion of the heel and the patterned portion of the toe portion, so that the above area may be of any desired walewise length between the minimum of the smallest foot produced and the maximum of the largest foot.

Figure 2:
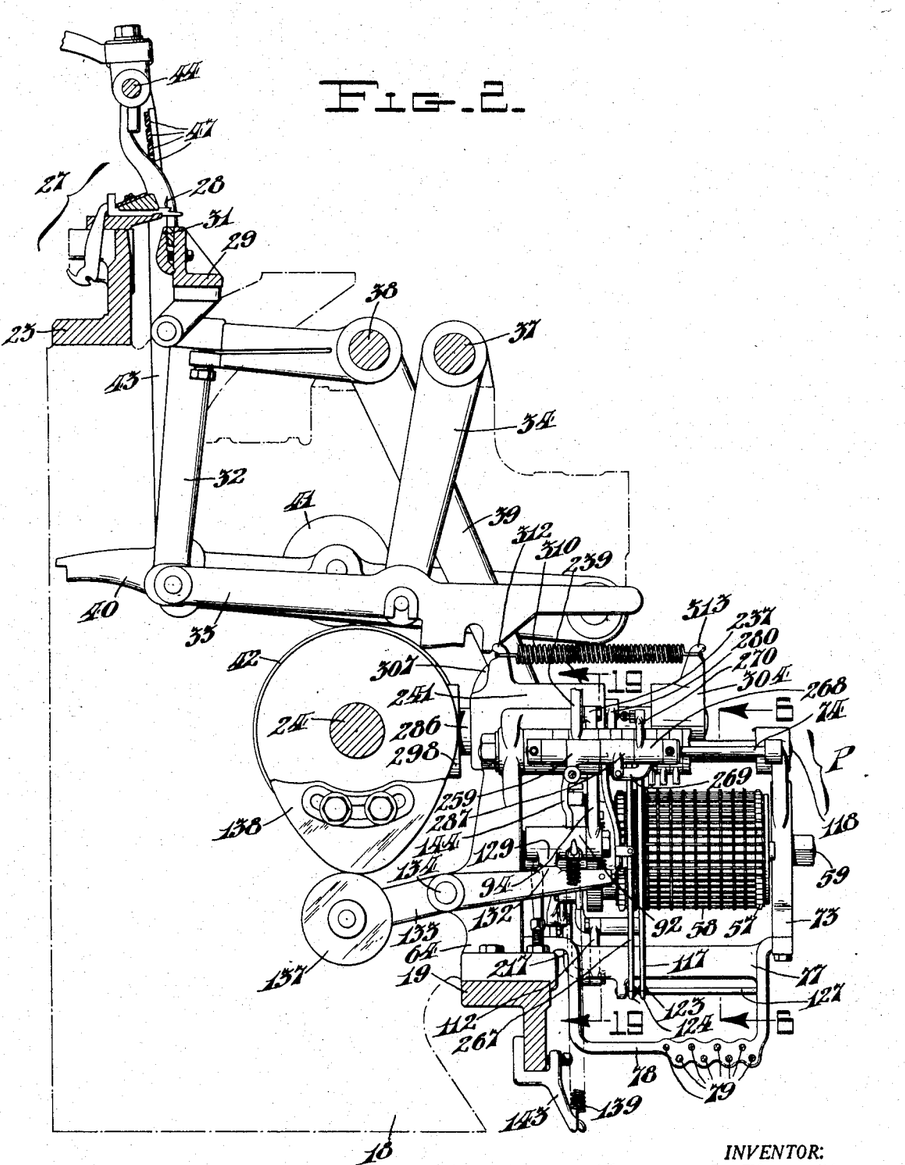
Fig. 2 is a cross sectional view of the machine, taken substantially along the line 2—2 of Fig. 1, enlarged relative thereto.

Referring to Figs. 1 and 2, a full fashioned knitting machine for which the invention is adapted, comprises a usual frame work including frames 17 and 18, respectively, which are held in spaced relation along the machine by members including a front beam 19, a back beam 22, a center bed 23, and a cam shaft 24, for imparting movement to the various units of the machine, supported on the framework.

A sinker head 27 cooperates with needle banks 28 for forming loops of the fabric; the needles being held to a needle bar 29 by a clamp 31. The needle banks 28 receive a horizontal movement from the cam shaft 24 through a needle bar fork 32, a rocker arm 33 and a presser lever 34 carried by a presser shaft 37. Vertical movement is imparted to the needle banks, from the cam shaft, by means of a needle bar shaft 38 and a needle bar lever 39 supported on the shaft 28.

A narrowing lift assembly includes a cam lever 40, a follower 41 on the lever for cooperation with a cam 42 on the cam shaft 24, a vertical lever 43, one end of which is connected to the lever 40 and the other end of which is connected to a front narrowing shaft 44 for supporting narrowing rods 47, which carry narrowing points for producing fashioning marks in the fabric. The narrowing rods 47 receive a lengthwise narrowing movement from a narrowing head assembly including, a narrowing head actuating lever 47, a narrowing spindle 52 and narrowing nuts 53 mounted for reverse movement on the spindle. The narrowing head assembly also includes end stops 49 for carrier rods (not shown), and a spindle resetting mechanism 54 for manually resetting the narrowing nuts 53 and the end stops 49.

The invention and the parts more directly associated therewith are represented generally, in Figs. 1 and 2, by a pattern device P and a dialing course counter device C, these devices being shown in enlarged detail in Figs. 3 to 22, inclusive.

Figure 13:
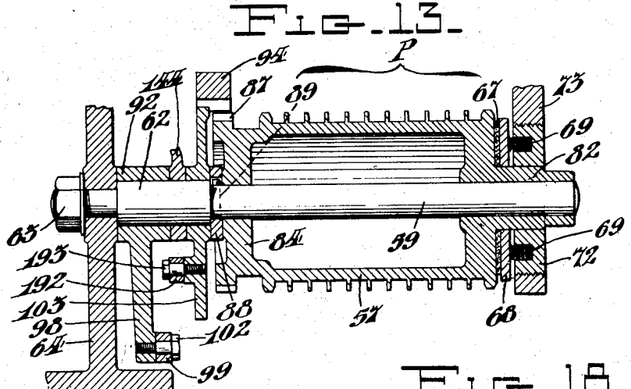
Fig. 13 is a sectional view taken substantially along the line 13—13 of Fig. 8.
Figure 14:
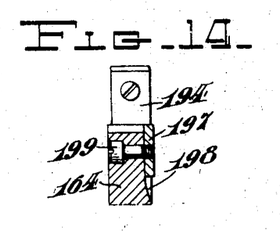
Fig. 14 is a detail sectional view taken substantially along the line 14—14 of Fig. 7, enlarged relative thereto.
Figure 15:
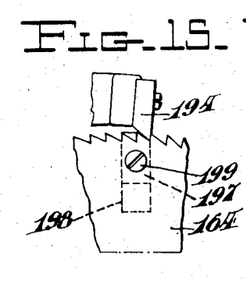
Fig. 15 is a view, in front elevation, as viewed from the left in Fig. 14.
Figure 16:
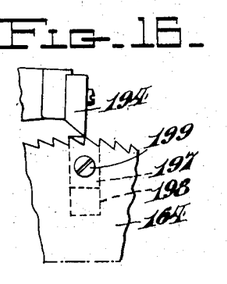
Fig. 16 is a view, similar to Fig. 15, showing the parts in different positions.

The device P includes a sprocket wheel or drum 57 for supporting one end of a usual pattern chain 58 supported at the other end by an idle sprocket wheel (not shown). The sprocket wheel 57 is rotatably mounted on a stationary spindle 59 having an enlarged portion 62 (Fig. 13). The latter bears against one side of a bracket 64 on the front beam 19 and, in cooperation with a nut 63 at the other side of the bracket, secures the spindle in position.

Movement of the sprocket wheel 57 is damped by a yieldable brake pad 67 held against one end of the wheel by a plate 68 and compression springs 69 disposed in recesses of a nut 72 in a bridge 73 (Fig. 2) between a rod 74 and a branch 77 of the bracket 64. A depending portion 78 of the branch 77, which is of substantially U-shape, longitudinally slidably supports control rods 79 that are similarly supported elsewhere on the machine, and further description of which is not essential to an understanding of the invention.

The sprocket wheel or drum 57 (Fig. 13) has a front bearing portion 82 journaled on the spindle 59 and in the nut 72. A rear bearing portion 84 of the wheel 57 is journaled on the spindle and carries a ratchet wheel portion 87. A thrust bearing washer 88 for the wheel 57 is fixed to the spindle 59 by a pin 89. A crank 92 journaled on the spindle 59 has one arm 93, on which a pawl 94 for the ratchet wheel 87 is pivotally supported by a pin 97, and another arm 98 pivotally connected to a link 99 by a pin 102.

Figures 9, 10, 11:
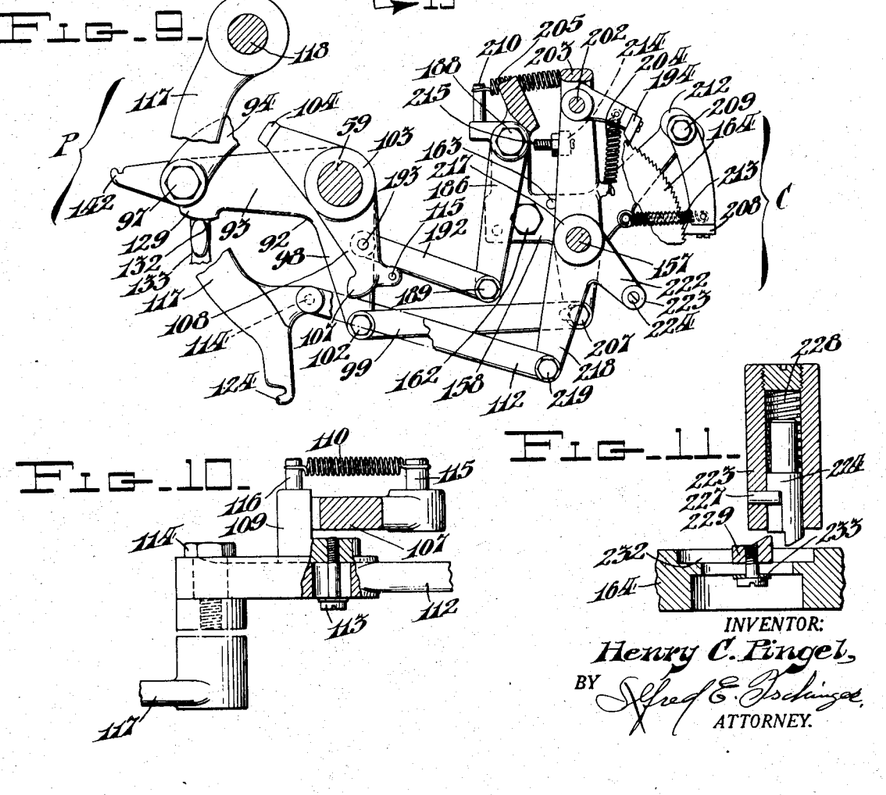
Fig. 9 is a view similar to Fig. 6, parts being removed and the others indicated as positioned during the stage of operation represented by Fig. 6.
Fig. 10 is a detail sectional view taken substantially along the line 10—10 of Fig. 6.
Fig. 11 is a detail sectional view taken substantially along the line 11—11 of Fig. 6.

A lever 103 (Fig. 9) has an end portion 104 of one arm constituting governing means for moving the pawl 94 into and out of engagement with the ratchet wheel 87, and an end portion 107 of its other arm 108 for engagement with a shoulder member 109 adjustably mounted along a link 112 by a screw and slot connector 113. The end 107 is connected to the shoulder 109 by a tension spring 110 (Figs. 7 and 10) extending between a pin 115 on the end 107 and a pin 116 on the shoulder 109 (Fig. 10). The link 112 is pivotally connected, at one end, by a pin 114 to a button follower lever 117, that is pivotally mounted on a shaft 118 supported by the bracket 64, and has an intermediate follower portion 119 for engagement with a button 122. The button follower lever 117 is biased toward the pattern chain 58 by a tension spring 123 extending between a lower end hook portion 124 of the lever and a rod 127 (Figs. 2, 6, 7 and 8) supported by the branch 77 of the bracket 64. Movement of the lever 117 toward the chain is limited by a set screw 128.

Figures 19, 20, 21, 22, 23, 24:
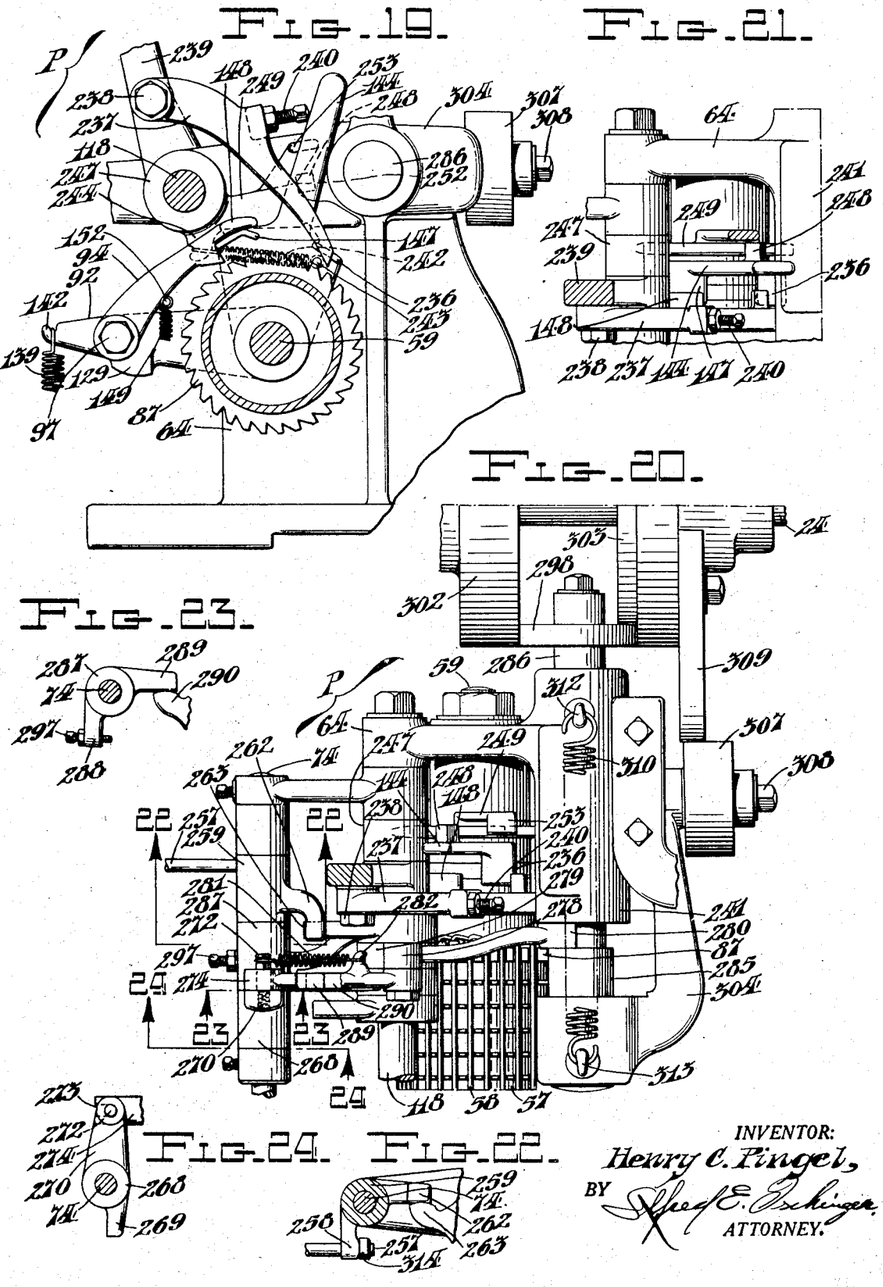
Fig. 19 is a sectional view of a portion of the device taken substantially along the line 19—19 of Fig. 2, enlarged relative thereto.
Fig. 20 is a top plan view, taken substantially along the line 20—20 of Fig. 7, of certain members thereof.
Fig. 21 is a top plan view of portions of Fig. 19.
Figs. 22, 23 and 24 are detail sectional views, taken substantially along the lines 22—22, 23—23 and 24—24, respectively, of Fig. 20.

The arm 93 of the crank 92 also has a shoulder portion 129 (Figs. 2, 6 and 9) for engagement with a shoulder portion 132 on a cam follower lever 133 that is pivotally mounted on the bracket 64 by a pin 134, and carries a roller follower 137 for engagement with a cam 138 on the cam shaft 24. The crank 92 is so biased by a spring 139, connected between a hook portion 142 thereof and a bracket 143 (Fig. 2) on the front beam 19, as to hold the portion 129 of the arm 93, as viewed in Fig. 9, in engagement with the portion 132 of the lever 133, during the pawling operation of the ratchet wheel 87. A hand lever 144, pivotally mounted on the spindle 59, has a portion 147 for engagement with a portion 148 of the pawl 94 for moving the pawl to, and holding it in, inactive position (Fig. 19). A spring 149 is connected between a pin 152, on the pawl 94, and a pin 153, on the cam follower lever 133, to bias the pawl toward the ratchet wheel 87.

Figure 4:
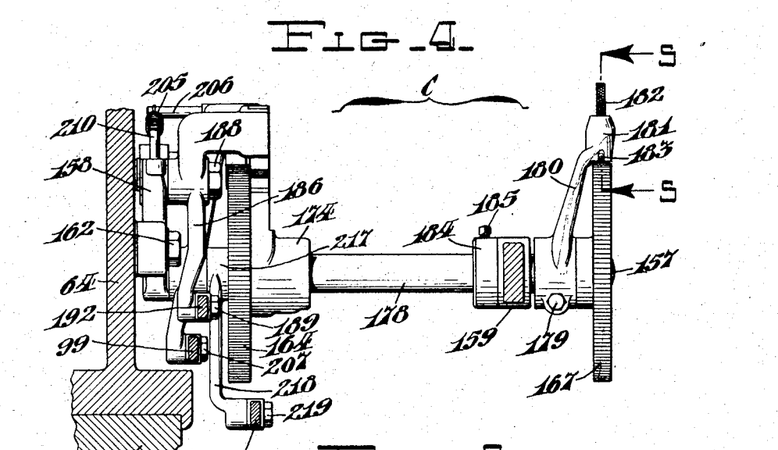
Fig. 4 is a sectional view taken substantially along the line 4—4 of Fig. 3.
Figure 5:
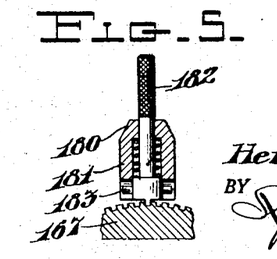
Fig. 5 is a detail sectional view taken substantially along the line 5—5 of Fig. 4, enlarged relative thereto.
Figure 12:
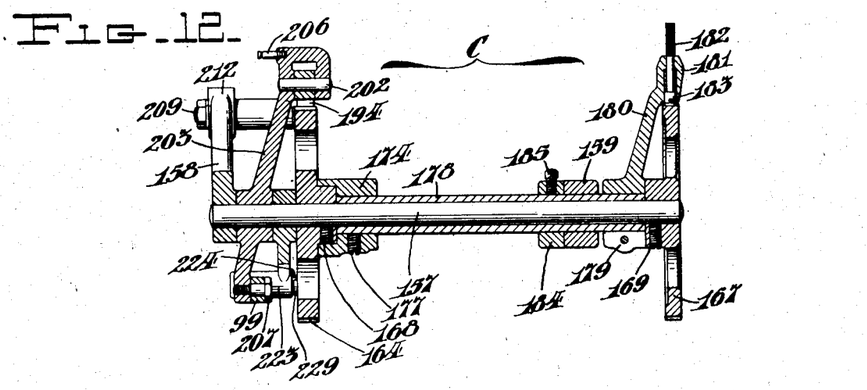
Fig. 12 is a view partially in section and partially in elevation, taken along the line 12—12 of Fig. 3.

The dialing course counter device C, see particularly Figs. 4 and 12, comprises a shaft 157 journaled at its rear end in a bracket 158, and supported, near its front end, in an extension 159 of the bridge 73, see also Fig. 1. The bracket 158 is secured to the bracket 64, by a screw 162 and a dowel pin 163 (Fig. 9). A ratchet disc, or wheel 164, and an index, or adjusting wheel 167, are secured to the shaft 157 by set screws 168 and 169, respectively. A dog 172 (Figs. 6 and 7) is secured, by screws 173, to an arm 174 secured, by a set screw 177, to a sleeve 178 to which is also fixed, as by a split sleeve and screw device 179, an arm 180 having a housing 181 at its free end enclosing a spring biased plunger detent 182 (Fig. 5) for cooperation with notches in the periphery of the adjusting wheel 167. The plunger 182 has a pin 183, extending therethrough, cooperating with a slot in the housing 181 to prevent turning of the plunger out of alignment with the notches in the wheel 167, and to limit the upward movement of the plunger. By lifting the detent 182, and turning the arm 180, the dog 172 can be moved or dialed to any position about the shaft 157. A collar 184, fixed to the sleeve 178 by a set screw 185, prevents movement of the parts to the right, as viewed in Fig. 12.

A dog follower lever 186, carrying a follower 187 for actuation by the dog 172, is pivotally mounted by a pin 188 on the bracket 158, and connected, by a pivot pin 189, to a link 192. The link 192 is connected, by a pivot pin 193, to the lever 103.

Figure 3:
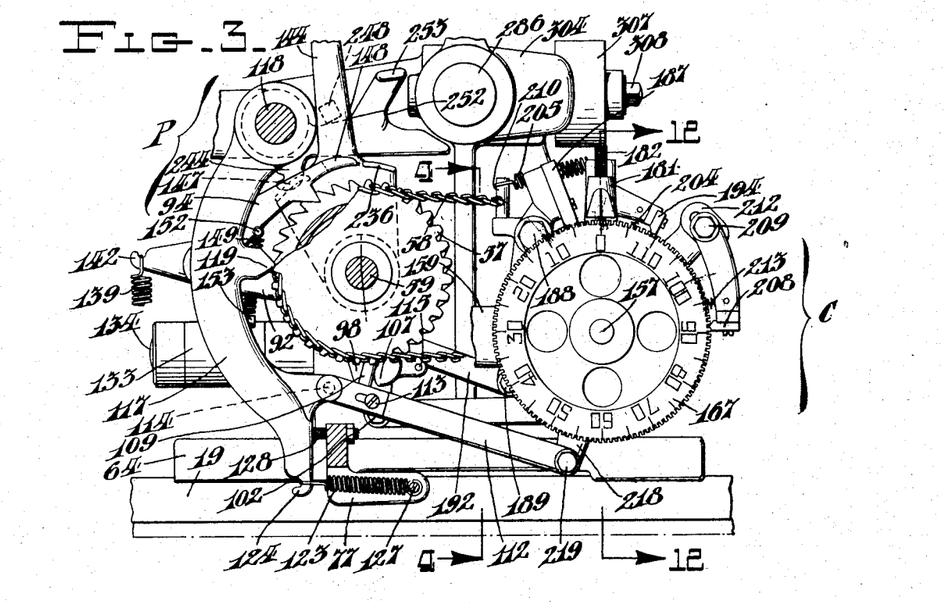
Fig. 3 is a front elevational view, certain parts being omitted, of the combined pattern and course counter mechanism of the invention, as seen in Fig. 1, but considerably enlarged thereover.

The wheel 167, in the present instance, has one hundred and twenty peripheral notches numbered on the face of the wheel, as shown in Figs. 1 and 3, which correspond in number and position to the teeth of the ratchet disc 164, and to the number of courses which the device counts. However, as better seen in Figs. 14, 15 and 16, one of the spaces between two of the disc teeth is closed to provide a dead spot on the disc against an advancing pawl or tongue 194 therefor by a bridge 197 held in a slot 198 by a screw 199. The pawl 194 is pivotally mounted by a pin 202 on one arm of a lever 203 and biased toward the ratchet disc 164 by a spring 204 (Fig. 9). The lever 203 is pivotally mounted on the shaft 157, and has another arm that is pivotally connected, by a pin 207, to the link 99. A tension spring 205 is connected, between pins 206 and 210 on the arm 203 and the bracket 158, respectively, to bias the lever 203 counter-clockwise, as viewed in Fig. 9, which movement is limited by engagement of a projection 214 with contact screws 215 on the bracket 158.

Figure 17:
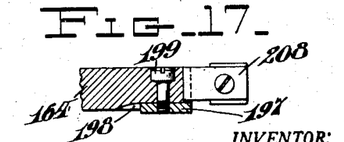
Fig. 17 is a detail sectional view taken substantially along the line 17—17 of Fig. 7, enlarged relative thereto.
Figure 18:
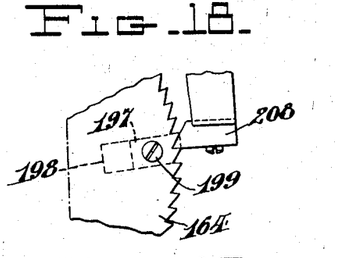
Fig. 18 is a view, in front elevation, of the structure of Fig. 17.

An idler pawl 201 carrying a slip tongue 208, see particularly Figs. 17 and 18, for preventing reverse movement of the ratchet disc 164, is of such width and position that it will enter all of the spaces between the ratchet disc teeth, including the space that is closed to the advancing pawl 194 by the bridge 197. The pawl 201 is pivotally mounted, by a pin 209, on an arm 212 of the bracket 158, and biased toward the disc 164 by a spring 213.

A lever 217, having one arm 218 connected by a pivot pin 219 to the link 112, has another arm 222 on which a sleeve 223 is disposed (Figs. 9 and 11). As better seen in Fig. 11, the sleeve 223 encloses a plunger detent 224 positioned by a pin 227, and biased, by a spring 228, toward a lug 229 held in position in a slot 232 in the ratchet disc 164, by a pin 233, the arrangement of parts being such that movement of the lever 217 in clockwise direction, as viewed in Fig. 9, will cause the detent 224 to engage the lug 229 to turn the ratchet disc 164, but movement of the disc through a complete cycle in clockwise direction will cause the lug 229 to slip under the detent 224.

In operation, at each revolution of the cam shaft 24, the high point of the cam 138 engages the roller 137 to move the lever 133 counter-clockwise, as viewed in Fig. 2, against the action of the spring 139. This action causes the lever 133 to engage the shoulder 129, on the crank 92, to move the latter clockwise about the spindle 59, as viewed in Fig. 9, which moves the pawl 94 forward by a distance of one tooth of the ratchet wheel 87, and, through the link 99, moves the lever 203 clockwise to cause the tongue 194 to move forward a distance of one tooth of the ratchet disc 164. Thus, although the pawl 94 and the tongue 194 are both turned forwardly once during each revolution of the cam shaft 24, they are not necessarily both advancing the associated ratchet wheels, as will appear.

Figure 6:
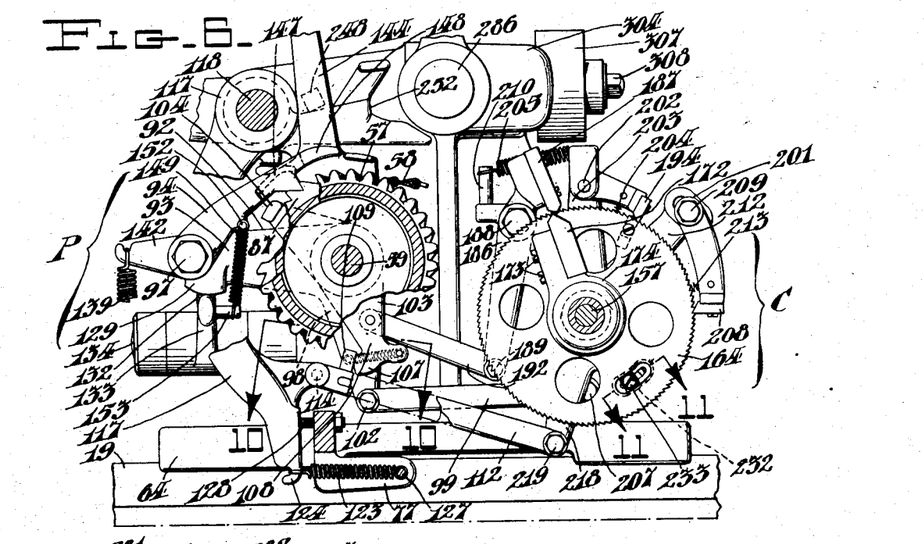
Fig. 6 is a sectional view, similar to Fig. 3, taken substantially along the line 6—6 of Fig. 2, showing the parts as positioned at one stage of operation.
Figure 7:
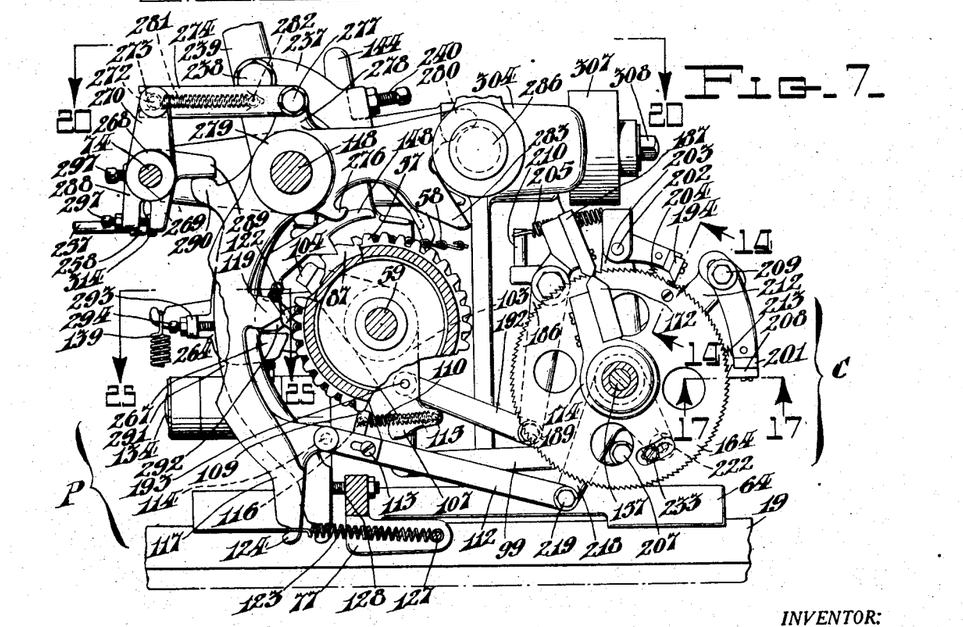
Fig. 7 is a view, similar to Fig. 6, of the mechanism thereof, with the parts indicated as positioned at another stage of operation, and illustrating other parts not shown in Fig. 6.

As indicated in Figs. 3 and 6, the device is adjusted to knit a foot blank portion of the smallest size. That is, as indicated in these figures, with the detent 183 in a notch opposite the zero mark of the adjusting wheel 167, and the pawl 194 in the position relative to the bridge 197 shown, when the pattern chain controls the knitting to the respective courses between the upper sole and the toe portion of the blank, the device C will not function, because, in order to function, it must add to the number of repetitive courses which are produced in the blank, and taken care of by the usual pattern chain 58. In the above mentioned zero position of the device C, the dog 172 is just to the left of the follower 187, and the pawl 194 is just about to be lifted onto the bridge 197. At the next forward movement of the pawl 94, the button 122 on the chain 58 engages the follower portion 119 of the lever 117, as indicated in Fig. 7, to move the button follower lever 117 to the left, which action moves the shoulder 109 away from the end portion 107 of the lever 103. This movement of the lever 117, causes engagement of the detent 224 with the lug 229 to cause the dog 172 to actuate its follower 187, and the pawl 194 to engage the bridge 197. This action of the dog 172 and its follower 187, causes the end portion 104 of the lever 103 to remain in inactive position relative to the pawl 94, although the spring 110 tends to cause the end portion 107 of the lever 103 to follow the shoulder 109.

Upon the next forward racking movements of the pawl 94 and the tongue 194, since the tongue 194 is on the bridge 197, it will move backwardly to engage a notch and to subsequently advance the disc. At the same time, the pawl 94 will continue to notch the ratchet wheel 87 to advance the pattern chain 58 to the end of the fabric.

Figure 8:
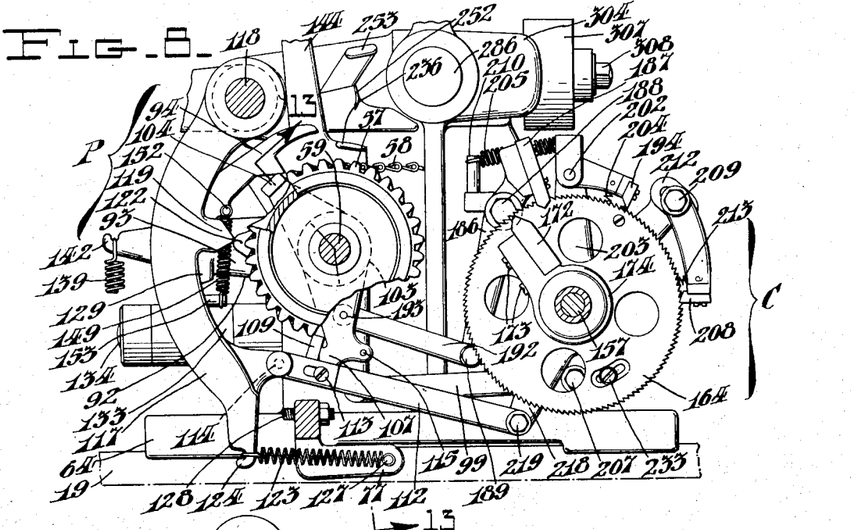
Fig. 8 is a view, similar to Fig. 6, of the mechanism thereof, the parts being illustrated as positioned during a further stage of operation.

When repetitive courses are to be added between the upper sole and toe areas to lengthen the foot, before starting the machine, the detent 183 is lifted out of the zero notch in the adjusting wheel, and moved counterclockwise to move the dog 172 likewise to position opposite any selected notch in the ratchet disc 164, as shown in Fig. 8.

With the parts in this position, the tongue 194 will merely idle from the beginning of the knitting of the foot portion of the stocking to the point at which the extra courses are to be inserted, at which time, the button 122 again moves the lever 117 as aforesaid. However, at this time, since the dog 172 does not engage the follower 187, when the shoulder 109 releases the lever 103, the latter is dragged by the spring 110 to the position, indicated in Fig. 8, to throw the pawl 94 to inactive position relative to the ratchet wheel 87. With this same action, the lever 117 drags the link 112 to turn the lever 217, which action engages the detent against the lug 229. This motion advances the ratchet disc 164 one notch to get the tongue 194 off the bridge 197, whereby the tongue may thereafter actuate the disc at each oscillation, until the dog 172 again engages the follower 187, as above described. When this occurs, the portion 104 of the lever 103 is moved counterclockwise, from the position shown in Fig. 8 to the position shown in Fig. 7, to cause the pawl 94 to resume forward racking of the ratchet wheel 87, and the tongue 194 continues to rack the disc 164 to position relative to the bridge 197 at the end of the knitting, when it is again rendered incapable of advancing the disc from the beginning of the knitting to the point where the extra repetitive courses are to be inserted.

Thus, no matter what the setting of the detent 183 relative to the adjusting wheel 167 for one, two, three, ten, twenty or on up to one hundred and twenty courses, the device C will not go into operation until actuated by the chain 58, but, after going into such operation for any number of courses, from zero up to one hundred and twenty, it will automatically reposition itself for knitting the next fabric, or it may be readjusted and automatically go into operation.

Referring particularly to Figs. 19 to 24, inclusive, in addition to the portion 147, which cooperates with a portion 148 of the pawl 94 to hold the latter in inactive position relative to the ratchet wheel 87, the hand lever 144 has a portion 236 for similarly holding a pawl 237 in inactive relation to the ratchet wheel 87. The pawl 237, which is pivoted by a pin 238 to a hand lever 239, normally operates to prevent backward movement of the ratchet wheel 87 after the latter has been notched forwardly by the pawl 94. Movement of the pawl 237, and the hand lever 239, for a distance of only one notch of the ratchet wheel 87, is limited by engagement of an adjustable set screw 240, in the pawl 237, with a shaft bearing portion 241 on the bracket 64.

With the hand lever 144 in the position of Fig. 19, both pawls 94 and 237 are in inactive position, so that the sprocket drum 57 and the pattern chain 58 may be freely moved in either direction, by turning a crank (not shown), fitted to the end of the spindle 59, protruding to the right, as viewed in Fig. 13. When the lever 144 is moved from its position of Fig. 3 to its position of Fig. 19, it stretches a spring 242 extending between a pin 243, on the lever 144, and a hook portion 244 on a latch 247 pivotally mounted on the shaft 118, the latch 247 thus being biased counterclockwise, as viewed in Fig. 19. Also, when the hand lever 144 is moved clockwise to its position of Fig. 19, a latch detent lug 248, on the handle, depresses an arm 249 of the latch 247 which, when the lug 248 moves beyond a shoulder 252 on the arm 249, causes the shoulder to assume its position of Fig. 19 behind the lug 248 to hold the parts in the positions shown. When the parts are to be returned to normal operative position, the latch arm 249 is depressed, by means of a finger piece 253, against the action of the spring 242, which releases the lug 248 and causes the lever 144 to move counterclockwise, from its position of Fig. 19 to its position of Fig. 3.

Figure 25:
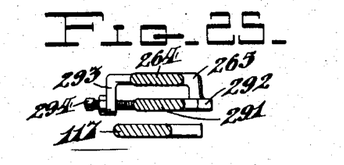
Fig. 25 is a sectional view taken substantially along the line 25—25 of Fig. 7.

A speed reducing switch 254 (Fig. 1), for the main drive motor (not shown) of the machine, is connected by a link 257, see also Figs. 7, 20 and 22, to one arm 258 of a bell crank 259, pivotally mounted on the rod 74. The other arm 262, of the bell crank 259, is adapted for engagement by a lug 263 on a lever 264 that is pivotally mounted on the shaft 118, and has a lateral projection 265 (Fig. 25), carrying a follower portion or projection 267 for engagement with a button on the pattern chain 58. A lever 268, also pivotally mounted on the rod 74, has a depending arm 269, and an upper arm 270, see also Fig. 24, which carries a pin 272 disposed in a slot 273 in one end of a link 274, the other end of which is pivotally connected, by a pin 277, to a projection 278 on a lever 279 that is pivotally mounted on the shaft 118, and spring biased clockwise, as viewed in Fig. 7, by a spring (not shown) connected to a hook portion 276 of the lever. A tension spring 281, see particularly Fig. 20, is connected between the pin 272 and a hook portion 282 on the link 274. The lever 279 has an arm or finger 280 for movement, about the axis of the shaft 118, to and from a position between a shoulder 285 on a stub shaft 286 and the bearing portion 241 in which the stub shaft is disposed. A finger 283, on the lever 279 adjacent to the finger 280, limits counterclockwise movement of the lever by engagement with the stub shaft 286. Another bell crank 287 (Fig. 23), pivotally mounted on the shaft 74, has a depending arm 288 carrying a screw 297 for engagement with the arm 269 of the lever 268, and an arm 289 for engagement by a lug 290 on a lever 291 having a follower portion 292 just above the follower portion 267 of the lever 264. A lateral projection 293, on the lever 264, carries a screw 294 for engagement with the lever 291.

The stub shaft 286 carries, at one end, a roller 298 (Fig. 20) for operation between shogging cams 302 and 303 (Figs. 1 and 20) on the cam shaft 24 and, at the other end, a bracket 304 which supports a roller 307 on a stud 308. The roller 307 is for actuation by a cam bit 309 fixed to the shogging cam 303. A spring 310, connected between hooks 312 and 313 on the bearing portion 241 and the bracket 304, respectively, biases the roller 298 toward the cam shaft 24 on which the shogging cams 302 and 303 are mounted.

After high speed knitting, at a course just prior to a course in which narrowings are to be effected, a button on the pattern chain 58 engages the follower portion 267 of the lever 264 to move the lug 263 against the arm 262 of the lever 259, which thereby moves counterclockwise about its pivot rod 74, as viewed in Figs. 7 and 22. This action moves the arm 258 of the lever 259 against a member 314, fixed to the link 257, to move the link to the right, and to thereby operate the switch 254 such that the speed of the machine is reduced.

In the next, or narrowed course above mentioned, the button, which had moved the follower portion 267 and the lever 264, as above described, engages the follower portion 292 of the lever 291 whereby, by engagement of the lever 291 with the screw 294, the lever 259 is maintained in its position corresponding to the slow, or narrowing, speed position of the switch, although the lever 259 is released by the lug 263, which would ordinarily allow the link 257 to be moved, to the left, by a spring (not shown), associated with the switch 254, to return the switch to its high speed position.

At the same time, the screw 297 engages the arm 269 of the lever 268 to move the link 274 to the left, as viewed in Fig. 7, and the cam bit 309 engages the roller 307 to relieve pressure of the spring 310 and the shoulder 285 against the finger 280 which is removed from position between the shoulder and the bearing portion 241. This action releases the stub shaft 286 which is moved, by the spring 310, to move the follower 298 inwardly, on the shogging cams 302 and 303, to effect shogging of the cam shaft 24 to the right, in a usual narrowing operation.

During the above described operation, since the finger 280 is relieved of the pressure of the shoulder 285 at the time the finger is to be lifted out of the position of Fig. 7, the connection, between the arm 270 and the link 274, operates like an ordinary pivotal connection without stretching the spring 281. However, when the machine is idle, and it is desired to advance the pattern chain 58 along its path of travel, by use of the hand lever 239 and the pawl 237, since the cam bit 309 does not engage the roller 307 to relieve the pressure of the shoulder 285 against the finger 280, the latter is held in position between the shoulder 285 and the bearing portion 241 by the spring 310. During this condition, and while the chain is being thus advanced by the hand lever 239, if a button on the chain 58 engages the follower 292 on the lever 291, the lug 290 can move the arm 289 to turn the lever 287, by movement of the pin 272 in the slot 273, against the action of the spring 281, since the link 274 is held stationary by the finger 280.

Of course, the improvements specifically shown and described by which I obtain the above results, can be changed and modified in various ways without departing from the invention herein disclosed and hereinafter claimed.

I claim as my invention:

1. Knitting machine pattern control mechanism comprising pattern means, and a follower therefor, means including a lever and a pawl for advancing the pattern means, a member for moving the pawl between active and inactive positions, a course counter including a ratchet disc, a dog adjustable relative to the ratchet disc, a follower for the dog, means connecting the dog follower and said member, means including a pawl for advancing the disc, means connecting said advancing means and said lever, means for rendering the disc pawl ineffective to advance the disc, and means controlled by the pattern means follower for rendering the disc pawl effective to advance the disc and including means for moving said member.

2. Knitting machine pattern control mechanism comprising pattern means and a follower therefor, means including a lever and a pawl for advancing the pattern means, a course counter including a ratchet disc having a dead spot, a member for moving the pawl between active and inactive positions, a dog adjustable relative to the disc, a follower for the dog, means including a link between the dog follower and said member, means including a pawl for advancing the disc, means connecting said advancing means and said lever, and means for rendering said dead spot ineffective to prevent operation of the disc pawl connected to the pattern means follower and including means for moving said member.

3. Knitting machine pattern control mechanism comprising pattern means and a follower therefor, means including a crank and a pawl for advancing the pattern means, a course counter including an adjusting wheel and a ratchet disc having a dead spot, a member for moving the pawl between active and inactive positions, a dog adjustable relative to the adjusting wheel and the disc, a follower for the dog, means including a link between the dog follower and said member, means including a pawl for advancing the disc, means connecting said advancing means and the crank, means for moving the disc to move said dead spot away from the disc pawl, and means connecting said disc moving means and the pattern means follower including means for moving said member.

4. Knitting machine pattern control mechanism comprising pattern means and a follower therefor, means including a crank and a pawl for advancing the pattern means, means including an adjusting wheel and a ratchet disc having a corresponding number of notches and teeth, respectively, means closing the space between two of the teeth, a member for moving the pawl between active and inactive positions, a dog adjustable relative to the adjusting wheel and the disc, a follower for the dog, means including a link between the dog follower and said member, means for advancing the disc, means connecting said advancing means and the crank, means for moving the disc, and means connecting said disc moving means and the pattern means follower including means for moving said member.

5. Knitting machine pattern control mechanism comprising a pattern chain, a pattern chain button follower lever, a button on the chain for the button follower lever, a spindle; a sprocket wheel for the chain, a ratchet wheel and a crank on the spindle, a pawl on the crank for the ratchet wheel, a lever on the spindle for moving the pawl between active and inactive positions, means including a cam, a cam follower and a follower arm for actuating the pawl, an axle, an adjusting wheel and a ratchet disc fixed to the axle and having a corresponding number of notches and teeth, respectively, a bridge closing the space between two of the teeth, a slip latch preventing reversal of the disc, a dog on the axle, means holding the dog in selected position on the axle relative thereto, a dog follower lever and a dog follower thereon, a link between the dog follower lever and said spindle lever, a tongue supporting arm and a tongue on the arm for advancing the disc, a link between the tongue arm and the crank, a detent support and a spring biased detent on the axle, a lug on the disc for cooperation with the detent, a bar connecting the detent support and the button follower lever, and means on the bar for moving said spindle lever.

6. Knitting machine pattern control mechanism comprising pattern means, a follower for the pattern means, an element carried by the pattern means for actuating the pattern means follower, means including a ratchet wheel and a crank for advancing the pattern means, means including a pawl on the crank for the ratchet wheel, a lever for moving the pawl between active and inactive positions, means including an adjusting wheel and a ratchet disc having a corresponding number of notches and teeth, respectively, a bridge closing the space between two of the teeth, a dog adjustable relative to the adjusting wheel and the disc, a follower for said dog, means including a link between the dog follower and said lever, means for advancing the disc, a link between said advancing means and the crank, means including a detent for moving the disc, and means connecting the detent and the pattern means follower and including means for moving said lever.

7. A full fashioned stocking knitting machine for producing stockings having foot portions of different sizes, comprising a pattern chain, pattern means including a pattern element of the chain and mechanism for advancing the chain, dialing means for controlling the laying of a selective number of repetitional courses between patterned areas of the heel and toe portions, and means for automatically controlling the operation of one of said means in predetermined relation to the operation of the other.

8. A full fashioned stocking knitting machine for producing stockings having foot portions of different sizes, comprising a pattern chain, pattern means including a pattern element of the chain and mechanism for advancing the chain, dialing means for controlling the laying of a selective number of repetitional courses between patterned areas of the heel and toe portions, and means for causing the pattern means to automatically control the operation of said dialing means.

9. A full fashioned stocking knitting machine for producing stockings having foot portions of different sizes, comprising a pattern chain, pattern means including a pattern element of the chain and mechanism for advancing the chain, dialing means for controlling the laying of a selective number of repetitional courses between patterned areas of the heel and toe portions, and means for causing the dialing means to automatically control the operation of said pattern means.

10. A full fashioned stocking knitting machine for producing stockings having foot portions of different sizes, comprising a pattern chain, pattern means including a pattern element of the chain and mechanism for advancing the chain, dialing means for controlling the laying of a selective number of repetitional courses between patterned areas of the heel and toe portions, and means for causing the pattern means to automatically control the operation of said dialing means and the dialing means to automatically control the operation of the pattern means.

11. Knitting machine pattern control mechanism comprising pattern means, a follower for the pattern means, an element carried by the pattern means for actuating the pattern means follower, means including a ratchet wheel and a crank for advancing the pattern means, means including a pawl on the crank for the ratchet wheel, a member for moving the pawl between active and inactive position, means including an adjusting wheel and a ratchet disc having effective teeth corresponding in number less one to the number of notches in the adjusting wheel, a dog adjustable relative to the adjusting wheel and the disc, a follower for said dog linked to said pawl-moving member, means linked to said crank for advancing said disc, means including a portion for moving the disc, and means connecting said portion and the pattern means follower and including means for moving said member.

12. A full fashioned stocking knitting machine for producing a number of courses in an intermediate portion of a fabric variable at will by a setting of the machine, comprising a pattern chain, pattern means including a pattern element of the chain and mechanism for advancing the chain, dialing means for controlling the laying of a selective number of repetitional courses between selected stocking portions including a rotatable member and a member arranged to be connected to said member optionally at any one of a number of spaced points covering an entire circle and so that the two members may rotate together when connected at any of said points, and means for automatically controlling the operation of one of said means in predetermined relation to the operation of the other.

13. A full fashioned stocking knitting machine for producing a number of courses in an intermediate portion of a fabric variable at will by a setting of the machine, comprising a pattern chain, pattern means including a pattern element of the chain and mechanism for advancing the chain, dialing means for controlling the laying of a selective number of repetitional courses between selected stocking portions including a rotatable member and a member arranged to be connected to said member optionally at any one of a number of spaced points covering an entire circle and so that the two members may rotate together when connected at any of said points, and means for causing the pattern means to automatically control the operation of said dialing means.

14. A full fashioned stocking knitting machine for producing a number of courses in an intermediate portion of a fabric variable at will by a setting of the machine, comprising a pattern chain, pattern means including a pattern element of the chain and mechanism for advancing the chain, dialing means for controlling the laying of a selective number of repetitional courses between selected stocking portions including a rotatable member and a member arranged to be connected to said member optionally at any one of a number of spaced points covering an entire circle and so that the two members may rotate together when connected at any of said points, and means for causing the dialing means to automatically control the operation of said pattern means.

15. A full fashioned stocking knitting machine for producing a number of courses in an intermediate portion of a fabric variable at will by a setting of the machine, comprising a pattern chain, pattern means including a pattern element of the chain and mechanism for advancing the chain, dialing means for controlling the laying of a selective number of repetitional courses between selected stocking portions including a rotatable member and a member arranged to be connected to said member optionally at any one of a number of spaced points covering an entire circle and so that the two members may rotate together when connected at any of said points, and means for causing the pattern means to automatically control the operation of said dialing means and the dialing means to automatically control the operation of the pattern means.

16. In a full fashioned knitting machine having a longitudinally shiftable cam shaft, means including said shaft for knitting courses of fabric, means for shifting said shaft from the knitting position to another in which special operations are performed on the fabric and back again, and pattern means for controlling said shifting and other operations, the combination with said pattern means of means for racking said pattern means including a rotatable member and a member arranged to be connected to said member optionally at any one of a number of spaced points covering an entire circle and so that the two members may rotate together when connected at any one of said points, means for interrupting said racking action for an optionally variable number of courses, and means for automatically starting said racking means again at the end of said courses.

17. In a full fashioned knitting machine, in combination, a longitudinally shiftable cam shaft, means including said cam shaft for knitting courses of fabric, means for shifting said shaft from the knitting position to another in which special operations are performed on the fabric, a pattern chain for controlling said shifting and said other operations, means for racking said pattern chain, means controlled by said chain for interrupting the action of said racking means for an optionally variable number of courses including a rotatable member and a member arranged to be connected to said member optionally at any one of a number of spaced points covering an entire circle and so that the two members may rotate together when connected at any one of said points, means for automatically starting said racking means again at the end of said courses, and means whereby said automatic starting means and said pattern chain are brought automatically to the same relative positions at the end of a given fabric as at the beginning irrespective of the number of said optional courses.

18. In a full fashioned knitting machine, in combination, a longitudinally shiftable cam shaft, means including said cam shaft for laying courses and knitting them in a fabric, means for shifting said shaft from the knitting position to another in which special operations are performed on the fabric, a pattern chain for controlling said shifting and said other operations, means for racking said pattern chain, means controlled by said pattern means for controlling said racking means and including a disk having numbered notches in its periphery and an arm having engaging means thereon, said arm mounted to swing so as to aline said engaging means with any of said notches, said controlling means including also means for interrupting the action of said racking means for a number of courses determined by the setting of said arm and for automatically starting said racking means again at the end of said courses, and means whereby said controlling means and said pattern chain are brought automatically to the same relative positions at the end of a given fabric as at the beginning so long as said arm retains the same position relative to said notched disk.

19. The combination with a knitting machine of a pattern chain, a course counting rotary means, means for delivering moving impulses to both said chain and said rotary means, and means adapted to be so set that said pattern chain will either interrupt its own receipt of moving impulses from said moving means or will not depending upon the setting of the settable means including a rotatable member and a member arranged to be connected to said member optionally at any one of a number of spaced points covering an entire circle and so that the two members may rotate together when connected at any one of said points, means whereby said pattern chain starts said rotary means, and means whereby said rotary means interrupts its receipt of impulses from said moving means at the same point in its revolution to maintain itself and the pattern chain in the same relation at the end of a fabric as at the beginning for a given setting of said settable means.

20. The combination with a knitting machine of a pattern means, a course counting means including a rotatable member and a member arranged to be connected to said member optionally at any one of a number of spaced points covering an entire circle and so that the two members may rotate together when connected at any one of said points, means whereby said course counting means remains stationary at the start of a fabric, means whereby said pattern means stops itself and starts said course counting means, means whereby said course counting means starts said pattern means, and means whereby said course counting means stops itself at the point at which it started, whereby the pattern means and course counting means have the same relative positions at the end as at the beginning of a given fabric.

21. The combination with a knitting machine of a pattern means, a course counting means, means including two pawls operating during the operation of the knitting machine and adapted to drive said pattern means by one pawl and said course counting means by the other pawl, means in said course counting means rendering its driving pawl ineffective while the course counting means is in a certain position, means whereby said pattern chain may start said course counting means a material period after the start of the pattern means by moving said course counter out of said certain position, means whereby the pattern means may render its own pawl ineffective at the time of starting said course counting means, and means whereby said course counting means may render said pawl for the pattern means effective, said course counting means thereupon continuing to rotate until reaching said certain position.

22. The combination with a knitting machine of a pattern means, a course counting means, means adapted to move both said means while the machine is in operation, said course counting means having means preventing said moving means from affecting it when the course counting means is in a certain position, means whereby said pattern means pushes said course counting means out of said certain position to cause said moving means to operate the course counting means, and a means adapted to be set either in a zero position or in any one of a number of other positions as desired and adapted when in other than said zero position to permit the interruption of the effect of said moving means on said pattern means for a number of courses varying with the setting, and to maintain the driving relation between said moving means and said pattern means when in the zero setting.

23. The combination with a knitting machine of a pattern means, a course counting means, means including two pawls for moving said pattern means and said course counting means, the pattern means by one pawl and the counting means by the other pawl, while the machine is running, said counting means including means whereby its pawl is ineffective and the counting means stands still while in a certain position, means whereby said pattern means pushes said counting means from said certain position to render its pawl effective, means whereby the action of said pushing means may render the pawl for the pattern means ineffective, and means adapted to be placed in a zero position or in any one of a number of other positions as desired, said last means adapted when in said zero position to prevent said pushing means from rendering the pawl for the pattern means ineffective and when in one of its other positions to render the pawl for the pattern means effective again.

24. The combination with a knitting machine of a pattern chain, a course counting means including two spaced disks fixed on the same shaft, one of said disks having ratchet-teeth, an arm swivelled on said shaft, means whereby said arm may be secured to said other disk in any one of a number of positions, a dog fixed to said arm, means for moving said chain and said disks when the machine is running including two pawls one for the chain and one for the toothed disk, said toothed disk having means whereby its pawl is ineffective when the disk is in a given position, means whereby a button on said chain pushes said disks out of said given position to start the operation of the disks, means whereby said pushing means renders ineffective the pawl for said chain when said arm is in any but a given position relative to said disks, and means whereby said dog renders the pawl for said chain effective again, said dog and said last means maintaining the pawl for said chain effective at the time said pushing means acts if the arm is in said given position.

25. A full fashioned stocking knitting machine for producing a number of courses in an intermediate portion of a fabric variable at will by a setting of the machine, comprising a pattern chain, pattern means including a pattern element of the chain and mechanism for advancing the chain including a driving sprocket having its axis of rotation maintained in constant position throughout the entire operation of the chain, dialing means for controlling the laying of a selective number of repetitional courses between selected stocking portions, and means for automatically controlling the operation of one of said means in predetermined relation to the operation of the other.

26. A full fashioned stocking knitting machine for producing a number of courses in an intermediate portion of a fabric variable at will by a setting of the machine, comprising a pattern chain, pattern means including a pattern element of the chain and mechanism for advancing the chain including a driving sprocket having its axis of rotation maintained in constant position throughout the entire operation of the chain, dialing means for controlling the laying of a selective number of repetitional courses between selected stocking portions, and means for causing the pattern means to automatically control the operation of said dialing means.

27. A full fashioned stocking knitting machine for producing a number of courses in an intermediate portion of a fabric variable at will by a setting of the machine, comprising a pattern chain, pattern means including a pattern element of the chain and mechanism for advancing the chain including a driving sprocket having its axis of rotation maintained in constant position throughout the entire operation of the chain, dialing means for controlling the laying of a selective number of repetitional courses between selected stocking portions, and means for causing the dialing means to automatically control the operation of said pattern means.

28. A full fashioned stocking knitting machine for producing a number of courses in an intermediate portion of a fabric variable at will by a setting of the machine, comprising a pattern chain, pattern means including a pattern element of the chain and mechanism for advancing the chain including a driving sprocket having its axis of rotation maintained in constant position throughout the entire operation of the chain, dialing means for controlling the laying of a selective number of repetitional courses between selected stocking portions, and means for causing the pattern means to automatically control the operation of said dialing means and the dialing means to automatically control the operation of the pattern means.

29. In a full fashioned knitting machine, in combination, a longitudinally shiftable cam shaft, means including said cam shaft for knitting courses of fabric, means for shifting said shaft from the knitting position to another in which special operations are performed on the fabric, a pattern chain for controlling said shifting and said other operations, means for racking said pattern chain including a driving sprocket over which the chain runs having its axis of rotation maintained in constant position throughout the entire operation of the chain, means controlled by said chain for interrupting the action of said racking means for an optionally variable number of courses, means for automatically starting said racking means again at the end of said courses, and means whereby said automatic starting means and said pattern chain are brought automatically to the same relative positions at the end of a given fabric as at the beginning irrespective of the number of said optional courses.

30. The combination with a knitting machine of a pattern chain, a course counting rotary means arranged to turn always in the same direction, means for delivering moving impulses to both said chain and said rotary means, and means adapted to be so set that said pattern chain will either interrupt its own receipt of moving impulses from said moving means or will not depending upon the setting of the settable means, means whereby said pattern chain starts said rotary means, and means whereby said rotary means interrupts its receipt of impulses from said moving means at the same point in its revolution to maintain itself and the pattern chain in the same relation at the end of a fabric as at the beginning for a given setting of said settable means.

31. The combination with a knitting machine of a pattern means, a course counting means including a rotary member whose angular motion is always in the same direction, means whereby said course counting means remains stationary at the start of a fabric, means whereby said pattern means stops itself and starts said course counting means, means whereby said course counting means starts said pattern means, and means whereby said course counting means stops itself at the point at which it started, whereby the pattern means and course counting means have the same relative positions at the end as at the beginning of a given fabric.

32. The combination with a knitting machine of a pattern means, a course counting means, means operating during the operation of the knitting machine and adapted to drive both said pattern means and said course counting means, means in said course counting means for interrupting its driven relationship with said driving means while the course counting means is in a certain position, means whereby said pattern chain may reestablish the driven relationship between said course counting means and said driving means a material period after the start of the pattern means by moving said course counting means out of said certain position, means whereby the pattern means interrupts its own driven relationship with said driving means at the time of starting said course counting means, and means whereby said course counting means may reestablish the driven relationship between the pattern means and said driving means, said course counting means arranged to thereupon continue to rotate until reaching said certain position.

HENRY C. PINGEL.